(12) United States Patent
Chehab

(10) Patent No.: US 12,378,641 B2
(45) Date of Patent: *Aug. 5, 2025

(54) PROCESS FOR MANUFACTURING AN ALUMINIUM ALLOY PART

(71) Applicant: C-TEC Constellium Technology Center, Voreppe (FR)

(72) Inventor: Bechir Chehab, Voiron (FR)

(73) Assignee: C-TEC Constellium Technology Center, Voreppe (FR)

(*) Notice: Subject to any disclaimer, the term of this patent is extended or adjusted under 35 U.S.C. 154(b) by 377 days.

This patent is subject to a terminal disclaimer.

(21) Appl. No.: 17/282,262

(22) PCT Filed: Oct. 3, 2019

(86) PCT No.: PCT/FR2019/052348
§ 371 (c)(1),
(2) Date: Apr. 1, 2021

(87) PCT Pub. No.: WO2020/070453
PCT Pub. Date: Apr. 9, 2020

(65) Prior Publication Data
US 2021/0230716 A1    Jul. 29, 2021

(30) Foreign Application Priority Data

Oct. 5, 2018  (FR) .................................. 1871133
Jul. 30, 2019  (FR) .................................. 1908678

(51) Int. Cl.
| | | |
|---|---|---|
| B22F 10/28 | (2021.01) | |
| B22F 1/00 | (2022.01) | |
| B22F 10/22 | (2021.01) | |
| B22F 10/25 | (2021.01) | |
| B22F 10/64 | (2021.01) | |
| B22F 12/41 | (2021.01) | |
| B33Y 40/20 | (2020.01) | |
| B33Y 70/00 | (2020.01) | |
| C21D 1/18 | (2006.01) | |
| C22C 1/04 | (2023.01) | |
| C22C 21/00 | (2006.01) | |
| C22F 1/04 | (2006.01) | |
| B22F 3/24 | (2006.01) | |
| B33Y 10/00 | (2015.01) | |

(52) U.S. Cl.
CPC .............. *C22C 1/0416* (2013.01); *B22F 1/00* (2013.01); *B22F 10/22* (2021.01); *B22F 10/25* (2021.01); *B22F 10/28* (2021.01); *B22F 10/64* (2021.01); *B22F 12/41* (2021.01); *B33Y 40/20* (2020.01); *B33Y 70/00* (2014.12); *C21D 1/18* (2013.01); *C22C 21/00* (2013.01); *C22C 21/003* (2013.01); *C22F 1/04* (2013.01); *B22F 2003/248* (2013.01); *B22F 2301/052* (2013.01); *B22F 2301/205* (2013.01); *B22F 2301/35* (2013.01); *B22F 2998/10* (2013.01); *B33Y 10/00* (2014.12)

(58) Field of Classification Search
CPC ...................................................... B22F 10/28
See application file for complete search history.

(56) References Cited

U.S. PATENT DOCUMENTS

| | | | | |
|---|---|---|---|---|
| 4,127,426 A | * | 11/1978 | Nicoud ................. | C22C 1/0416 419/41 |
| 2001/0031398 A1 | | 10/2001 | Hashimoto et al. | |
| 2017/0016096 A1 | | 1/2017 | Wentland et al. | |
| 2018/0214949 A1 | * | 8/2018 | Martin ..................... | B22F 5/02 |
| 2019/0309402 A1 | * | 10/2019 | Karabin ................. | C22C 21/02 |

FOREIGN PATENT DOCUMENTS

| | | |
|---|---|---|
| CN | 108330344 A | 7/2018 |
| JP | 2004211117 A | 7/2004 |
| WO | 2015006447 A1 | 1/2015 |
| WO | 2016209652 A1 | 12/2016 |

OTHER PUBLICATIONS

Qi, Xing, et al. "Laser powder bed fusion of a near-eutectic Al—Fe binary alloy: Processing and microstructure." Additive Manufacturing 35 (2020): 101308. (Year: 2020).*
Loginova, I. S., et al. "Evaluation of microstructure and hardness of novel Al—Fe—Ni alloys with high thermal stability for laser additive manufacturing." JOM 72 (2020): 3744-3752. (Year: 2020).*
Gibson I., Rosen D., Stucker B. (2010), "Additive Manufacturing Technologies", Springer, Boston, MA (hereinafter "Gibson"). (Year: 2010).*
PCT International Search Report for PCT/FR2019/052348 mailed Dec. 11, 2019.
Zhong et al., "Technology for Production Of Medium and Heavy Aluminum Alloy Plate," Metallurgical Industry Press, May 2009, pp. 43-47.

(Continued)

*Primary Examiner* — Christopher S Kessler
(74) *Attorney, Agent, or Firm* — McBee Moore & Vanik IP, LLC

(57) ABSTRACT

A process for manufacturing a part comprising a formation of successive metal layers, superimposed on one another, wherein each layer is formed by the deposition of a filler metal, the filler metal being subjected to an input of energy so as to melt and to constitute said layer by solidifying, the process being characterized in that the filler metal is an aluminium alloy comprising the following alloy elements (% by weight): —Fe: 2% to 8%, and preferably 2% to 6%, more preferentially 3% to 5%; —optionally Zr: 0.5% to 2.5% or 0.5% to 2% or 0.7% to 1.5%; —optionally Si: <1%, or even <0.5% or even <0.2% or even <0.05%; —optionally Cu: ≤0.5%, or even <0.2%, or even <0.05%; —optionally Mg: ≤0.2%, preferably ≤0.1%, preferably <0.05%; —optionally other alloy elements<0.1% individually and in total<0.5%; —impurities: <0.05%, or even <0.01% individually, and in total<0.15%; remainder aluminium.

15 Claims, 3 Drawing Sheets

(56) References Cited

OTHER PUBLICATIONS

Huang, "A Handbook of Ship Hull Technology," National Defense Industry Press, Jan. 2012, cover with summary and copyright page (2pp).

English translation of Office Action issued in corresponding Chinese Patent Application No. 201980065700.X (issued Mar. 31, 2023).

Zhong Li et al., Technology for production of medium and heavy aluminum alloy plate, pp. 44-47, Metallurgical Industry Press, published May 2009, with English translation.

Huang Hao, A Handbook of Ship Hull Technology, National Defense Industry Press, published Jan. 2012, with English translation.

* cited by examiner

[Fig. 1]
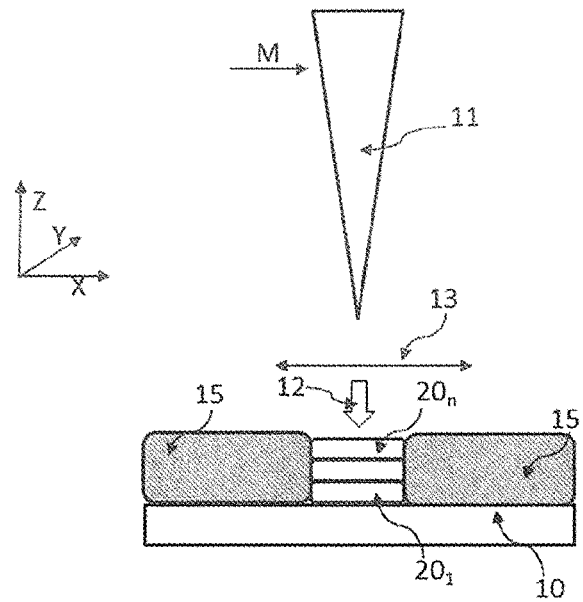
[Fig. 2]
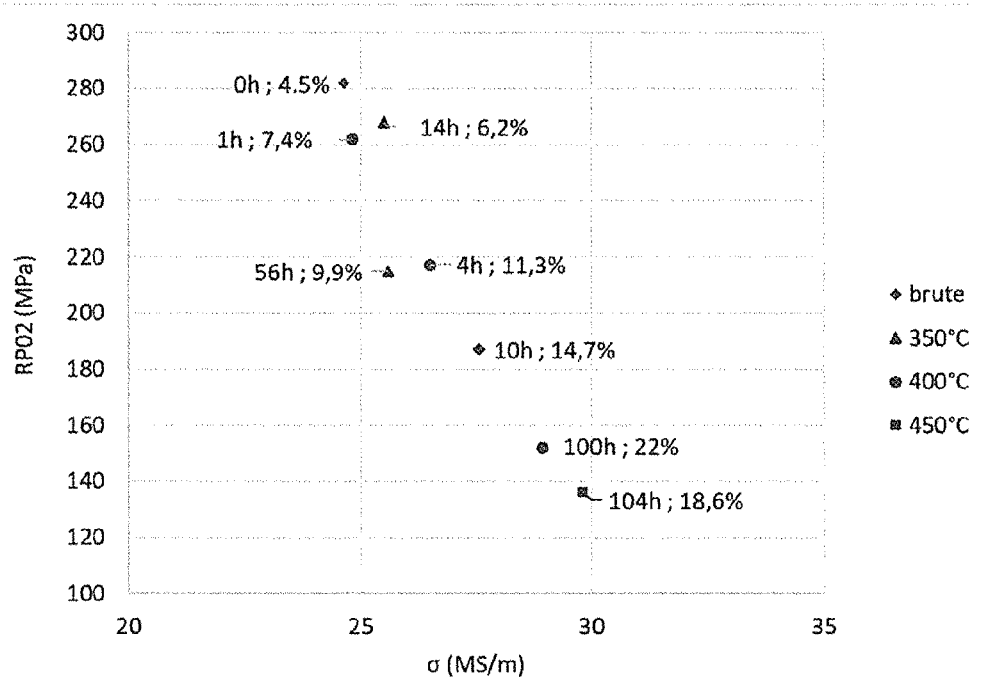

[Fig. 3]
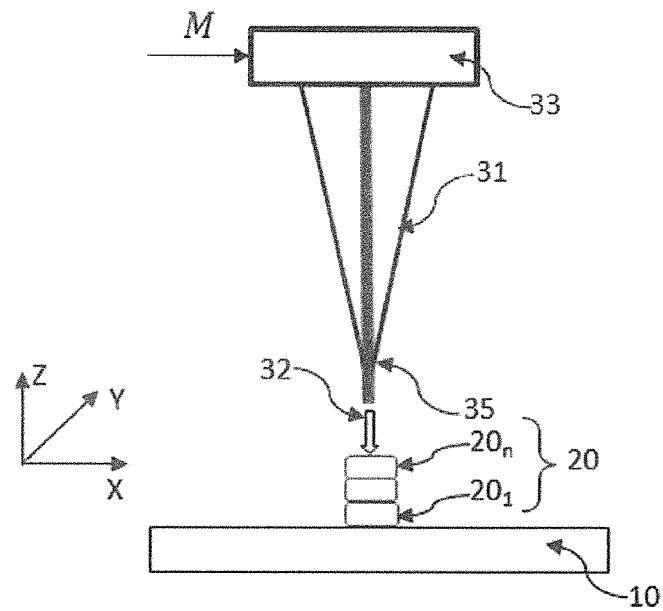
[Fig. 4]
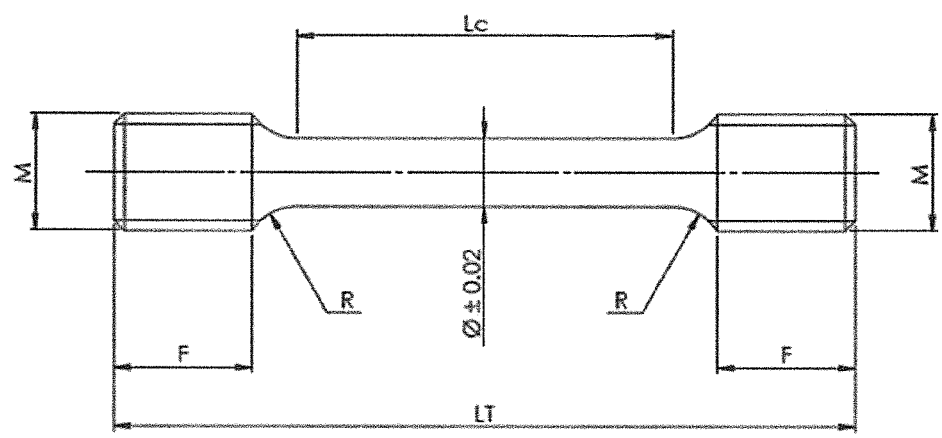

[Fig. 5]
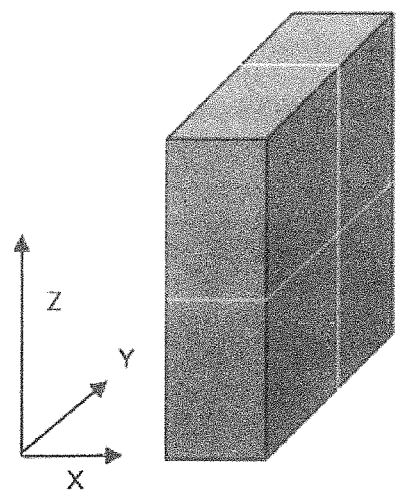

PROCESS FOR MANUFACTURING AN ALUMINIUM ALLOY PART

CROSS-REFERENCE TO RELATED APPLICATIONS

This application is the National Stage entry of International Application No. PCT/FR2019/052348, filed 3 Oct. 2019, which claims priority to French Patent Application No. 1871133, filed 5 Oct. 2018 and French Patent Application No. 1908678, filed 30 Jul. 2019.

BACKGROUND

Field

Technical Field

The technical field of the invention is a process for manufacturing an aluminum alloy part, using an additive manufacturing technique.

Description of Related Art

Since the 1980s, additive manufacturing techniques have been developed. They consist of forming a part by adding material, which is the opposite of machining techniques, which are aimed at removing material. Previously confined to prototyping, additive manufacturing is now operational for manufacturing mass-produced industrial products, including metallic parts.

The term "additive manufacturing" is defined as per the French standard XP E67-001 as a set of processes for manufacturing, layer upon layer, by adding material, a physical object from a digital object. The standard ASTM F2792 (January 2012) also defines additive manufacturing. Various additive manufacturing methods are also defined in the standard ISO/ASTM 17296-1. The use of additive manufacturing to produce an aluminum part, with a low porosity, was described in the document WO2015006447. The application of successive layers is generally carried out by applying a so-called filler material, then melting or sintering the filler material using an energy source such as a laser beam, electron beam, plasma torch or electric arc. Regardless of the additive manufacturing method applied, the thickness of each layer added is of the order of some tens or hundreds of microns.

Further additive manufacturing methods can be used. Let us mention for example, and non-restrictively, melting or sintering a filler material taking the form of a powder. This may consist of laser melting or sintering. Patent application US20170016096 describes a process for manufacturing a part by localized melting obtained by exposing a powder to an electron beam or laser beam type energy, the process also being known as the acronyms SLM, meaning "Selective Laser Melting", or "EBM", meaning "Electron Beam Melting".

The mechanical properties of aluminum parts obtained by additive manufacturing are dependent on the alloy forming the filler metal, and more specifically on the composition thereof as well as on the thermal treatments applied following the implementation of additive manufacturing.

The applicant determined an alloy composition which, used in an additive manufacturing process, makes it possible to obtain parts with remarkable mechanical performances, without it being necessary to implement thermal treatments such as solution heat treatments and quenching. Furthermore, the parts used have advantageous thermal conductivity or electrical conductivity properties. This makes it possible to diversify the application possibilities of these parts.

SUMMARY

The invention firstly relates to a process for manufacturing a part including a formation of successive metal layers, which are superimposed on each other, each layer being formed by depositing a filler metal, the filler metal being subjected to a supply of energy so as to become molten and to constitute, upon solidifying, said layer, the process being characterized in that the filler metal is an aluminum alloy including the following alloy elements (% by weight);
Fe: 2% to 8%, and preferably 2% to 6%, more preferably 3 to 5%;
optionally Zr: 0.5% to 2.5% or 0.5 to 2% or 0.7 to 1.5%;
optionally Si: <1%, or <0.5% or <0.2%, or <0.05%;
optionally Cu: ≤0.5%, or <0.2%, or <0.05%;
optionally Mg: ≤0.2%, preferably ≤0.1% preferably <0.05%;
optionally other alloy elements<0.1% individual and in total<0.5%;
impurities: <0.05%, or <0.01% individually, and in total<0.15%;
remainder aluminum.

Preferably, the quantity of Fe is greater than the quantity of Zr.

Of the other alloy elements, mention can be made for example of Cr, V, Ti, Mn, Mo, W, Nb, Ta, Sc, Ni, Zn, Hf, Nd, Ce, Co, La, Ag, Li, Y, Yb, Er, Sn, In, Sb, Sr, Ba, Bi, Ca, P, B and/or mischmetal.

In a manner known to a person skilled in the art, the composition of the mischmetal is generally from about 45 to 50% cerium, 25% lanthanum, 15 to 20% neodymium and 5% praseodymium.

According to an alternative embodiment of the present invention, there is no voluntary addition of Zn, particularly due to the fact that it evaporates during the SLM process.

BRIEF DESCRIPTION OF THE DRAWINGS

FIGS. 1-5 depict embodiments as described herein.

DETAILED DESCRIPTION OF A PREFERRED EMBODIMENT

According to an alternative embodiment of the present invention, the alloy is not an AA7xxx type alloy.

The process can include the following features, taken in isolation or according to technically feasible combinations:
the alloy includes no Cr, V, Mn, Ti, Mo, or according to a mass fraction less than 500 ppm, than 300 ppm, than 200 ppm, or less than 100 ppm;
the mass fraction of each other alloy element is less than 500 ppm, or than 300 ppm, or than 200 ppm, or than 100 ppm;
the mass fraction of Zr is strictly less than 0.5%, or than 0.2% or than 0.05%;
the mass fraction of Si is strictly less than 0.5%, or than 0.2% or than 0.05%;
Fe: 2% to 8% and Zr: 0.5% to 2.5% and Si: <0.5%;
Fe: 2% to 8% and Zr<0.5% and Si: <0.5%;
Fe: >3% and ≤8%.
Each layer can particularly describe a pattern defined on the basis of a digital model.

The process can include, following the formation of the layers, an application of at least one thermal treatment. The thermal treatment can be or include an aging or an annealing, capable of being performed at a temperature preferably from 200° C. to 500° C.

The thermal treatment can then be performed:
at a temperature from 200° C. to less than 400° C., preferably from 320 to 380° C., in which case the duration of the thermal treatment is from 0.1 h to 20 h;
or at a temperature from 400° C. to 500° C., in which case the duration of the thermal treatment is preferably from 0.1 h to 5 h;

The thermal treatment can also include a solution heat treatment and a quenching, although it is preferred to avoid them. It can also include a hot isostatic compression.

According to an advantageous embodiment, the process includes no quenching, following the formation of the layers or the thermal treatment. Thus, preferably, the process does not include steps of solution heat treatment followed by a quenching.

According to a further embodiment, the filler metal is obtained from a filler wire, the exposure of which to a heat source, for example an electric arc, results in a localized melting followed by a solidification, so as to form a solid layer. According to a further embodiment, the filler metal takes the form of a powder, the exposure of which to a light beam or charged particles results in a localized melting followed by a solidification, so as to form a solid layer.

The invention secondly relates to a metal part, obtained after applying a process according to the first subject matter of the invention.

The invention thirdly relates to a filler metal, particularly a filler wire or a powder, intended to be used as a filler material of an additive manufacturing process, characterized in that it is formed from an aluminum alloy, including the following alloy elements (by weight):
Fe: 2% to 8%, and preferably 2% to 6%, more preferably 3 to 5%;
optionally Zr: 0.5% to 2.5% or 0.5 to 2% or from 0.7 to 1.5%;
optionally Si: <1%, or <0.5% or <0.2%, or <0.05%;
optionally Cu: ≤0.5%, or <0.2%, or <0.05%;
optionally Mg: ≤0.2%, preferably ≤0.1% preferably <0.05%;
optionally other alloy elements<0.1% individual and in total<0.5%;
impurities: <0.05%, or <0.01% individually, and in total<0.15%;
remainder aluminum.

The aluminum alloy forming the filler material can have the features described in relation to the first subject matter of the invention.

The filler material can be presented in the form of a powder. The powder can be such that at least 80% of the particles making up the powder have a mean size in the following range: 5 μm to 100 μm, preferably from 5 to 25 μm, or from 20 to 60 μm.

When the filler material is presented in the form of a wire, the diameter of the wire can particularly be from 0.5 mm to 3 mm, and preferably from 0.5 mm to 2 mm, and more preferably from 1 mm to 2 mm.

Further advantages and features will emerge more clearly from the following description of specific embodiments of the invention, given by way of non-limiting examples, and represented in the figures listed below.

FIGURES

FIG. 1 is a diagram illustrating an SLM type additive manufacturing process.

FIG. 2 illustrates the tensile and electrical conduction properties determined during experimental tests, using samples manufactured using an additive manufacturing process according to the invention.

FIG. 3 is a diagram illustrating a WAAM type additive manufacturing process.

FIG. 4 is a diagram of the cylindrical TOR4 type test specimen used according to the examples.

FIG. 5 is a diagram of the two test parts of the example.

DESCRIPTION OF SPECIFIC EMBODIMENTS

In the description, unless specified otherwise:
aluminum alloys are designated according to the nomenclature of the Aluminum Association;
the chemical element contents are designated as a % and represent mass fractions. The notation x %-y % means greater than or equal to x % and less than or equal to y %.

Impurity denotes chemical elements unintentionally present in the alloy.

FIG. 1 schematically represents the operation of a Selective Laser Melting (SLM) additive manufacturing process. The filler metal 15 is presented in the form of a powder disposed on a support 10. An energy source, in this case a laser source 11, emits a laser beam 12. The laser source is coupled with the filler material by an optical system 13, the movement whereof is determined according to a digital model M. The laser beam 12 is propagated along a propagation axis Z, and follows a movement along a plane XY, describing a pattern dependent on the digital model. The plane is for example perpendicular to the propagation axis Z. The interaction of the laser beam 12 with the powder 15 induces selective melting thereof, followed by a solidification, resulting in the formation of a layer $20_1 \ldots 20_n$. When a layer has been formed, it is coated with filler metal powder 15 and a further layer is formed, superimposed on the layer previously produced. The thickness of the powder forming a layer can for example be from 10 to 200 μm.

The powder can have at least one of the following features:
Mean particle size from 5 to 100 μm, preferably from 5 to 25 μm, or from 20 to 60 μm.
The values given signify that at least 80% of the particles have a mean size within the specified range.
Spherical shape. The sphericity of a powder can for example be determined using a morphogranulometer.
Good castability. The castability of a powder can for example be determined as per the standard ASTM B213 or the standard ISO 4490:2018. According to the standard ISO 4490:2018, the flow time is preferably less than 50 s.
Low porosity, preferably from 0 to 5%, more preferably from 0 to 2%, even more preferably from 0 to 1% by volume. The porosity can particularly be determined by optical micrograph image analysis or by helium pycnometry (see the standard ASTM B923).
Absence or small quantity (less than 10%, preferably less than 5% by volume) of small, so-called satellite, particles (1 to 20% of the mean size of the powder), which adhere to the larger particles.

The use of such a process enables a manufacture of parts according to a high yield, of up to 40 $cm^3/h$.

The applicant observed that applying thermal treatments such as quenching could induce distortion of the part, due to the sudden temperature variation. The distortion of the part is generally all the more significant as the dimensions thereof are large. Yet, the advantage of an additive manufacturing process is specifically that of obtaining a part wherein the shape, after manufacturing is definitive, or virtually definitive. The occurrence of a significant deformation resulting from a thermal treatment is therefore to be avoided. By virtually definitive, it is understood that finishing machining can be performed on the part after the manufacturing thereof: the part manufactured by additive manufacturing extends according to the definitive shape thereof, apart from the finishing machining.

Having observed the above, the applicant sought an alloy composition, forming the filler material, making it possible to obtain acceptable mechanical properties, without requiring the application of thermal treatments, subsequent to the formation of the layers, liable to induce distortion. The aim is particularly to avoid thermal treatments involving a sudden temperature variation. Thus, the invention makes it possible to obtain, by additive manufacturing, a part wherein the mechanical properties are satisfactory, in particular in terms of yield strength. According to the type of additive manufacturing process selected, the filler material can be presented in the form of a wire or a powder.

The applicant observed that, by limiting the number of elements present in the alloy, above a content of 1%, a good compromise between advantageous mechanical and thermal properties is obtained. It is usually acknowledged that adding elements to the alloy makes it possible to enhance certain mechanical properties of the part produced by additive manufacturing. The term mechanical properties denotes for example the yield strength or the elongation at rupture. However, adding an excessively large quantity, or an overly wide diversity, of chemical alloy elements can be detrimental to the thermal conduction properties of the part resulting from additive manufacturing. Thus, the use of binary or ternary alloys, in an additive manufacturing process, represents a promising avenue in the field of additive manufacturing.

The applicant considered that it was useful to reach a compromise between the number and the quantity of elements added to the alloy, so as to obtain acceptable mechanical and thermal (or electrical) properties.

The applicant considers that such a compromise is obtained by limiting to one or two the number of chemical elements forming the aluminum alloy having a mass fraction greater than or equal to 1% or 0.5%. Thus, a particularly advantageous alloy can be obtained by adding, according to a mass fraction greater than 1% or 0.5%:

only Fe, where Fe: 2% to 8%, in which case the alloy essentially consists of two elements (Al and Fe);

or Fe (where Fe: 2% to 8%) and Zr (where Zr: 0.5% to 2.5%, in which case the alloy essentially consists of three elements (Al, Fe and Zr). The presence of Zr generally enhances the mechanical properties after thermal treatment.

The alloy can also include other alloy elements, such as Cr, V, Ti, Mn, Mo, W, Nb, Ta, Sc, Ni, Zn, Hf, Nd, Ce, Co, La, Ag, Li, Y, Yb, Er, Sn, In, Sb, Sr, Ba, Bi, Ca, P, B and/or mischmetal having individually a content<0.1% by weight. However, some of these alloy elements, in particular Cr, V, Ti and Mo degrade the conductivity, therefore it is preferable to avoid them. Cu is considered the less harmful with regard to thermal conductivity.

According to an alternative embodiment of the present invention, there is no voluntary addition of Zn, particularly due to the fact that it evaporates during the SLM process.

According to an alternative embodiment of the present invention, the alloy is not an AA7xxx type alloy.

Adding Mg in the absence of a solution-heat treatment-quenching-aging treatment, would lower the electrical or thermal conductivity without a significant impact on the mechanical properties. To this is added its tendency to evaporate during the atomization and SLM process, especially for high-liquidus alloys such as those tested according to the present invention. Thus, according to an alternative embodiment, the alloy used according to the present invention comprises no Mg or else according to an impurity quantity, i.e. <0.05%.

When the other alloy elements are for example Y, Yb, Er, Sn, In, Sb, these elements are preferably present individually according to a mass fraction strictly less than 500 ppm, and preferably strictly less than 300 ppm, or 200 ppm, or 100 ppm.

It should be noted that, preferably, the alloys according to the present invention are not AA6xxx type alloys, due to the lack of simultaneous addition of Si and Mg in quantities greater than 0.2%.

Experimental Examples

A test was carried out using a binary alloy, in which the composition included Fe 4%; impurities and other alloy elements: <0.05% individually.

Test parts were produced by SLM, using an EOS290 SLM type machine (supplier EOS). The laser power was 370 W. The sweep rate was 1400 mm/s. The deviation between two adjacent sweeping lines, usually referred to as "vector deviation" was 0.11 mm. The layer thickness was 60 µm, with heating of the construction slab to 200° C.

The powder used had a particle size essentially from 3 µm to 100 µm, with a median of 40 µm, a 10% fractile of 16 µm and a 90% fractile of 79 µm.

First test parts were produced, in the form of vertical cylinders with respect to the construction slab (Z direction) of diameter 11 mm and height 46 mm. Second test parts were produced, taking the form of parallelepipeds of dimensions 12 (X direction)×45 (Y direction)×46 (Z direction) mm (see FIG. 5). All the parts underwent a post-SLM manufacturing stress relief treatment of 4 hours at 300° C.

Some first parts underwent a post-manufacturing thermal treatment at 350° C., 400° C. or 450° C., the treatment duration being from 1 h to 104 h. All of the first parts (with and without post-manufacturing thermal treatment) were machined to obtain TOR4 type cylindrical tensile test specimens having the following characteristics in mm (see Table 1 and FIG. 4):

In FIG. 4 and Table 1, Ø represents the diameter of the central portion of the test specimen, M the width of the two ends of the test specimen, LT the total length of the test specimen, R the radius of curvature between the central portion and the ends of the test specimen, Lc the length of the central portion of the test specimen and F the length of the two ends of the test specimen.

TABLE 1

| Type | Ø | M | LT | R | Lc | F |
|---|---|---|---|---|---|---|
| TOR 4 | 4 | 8 | 45 | 3 | 22 | 8.7 |

These cylindrical test specimens underwent tensile testing at ambient temperature as per the standard NF EN ISO 6892-1 (2009-10).

Some of the second test parts underwent a post-manufacturing thermal treatment, as described in relation to the first parts. The second test parts were subjected to electrical conductivity tests, on the basis that the electrical conductivity evolves similarly to thermal conductivity. A linear dependency relationship of the thermal conductivity and the electrical conductivity, according to the Wiedemann-Franz, was validated in the publication by Hatch "Aluminium properties and physical metallurgy" ASM Metals Park, OH, 1988. The second test parts underwent surface polishing on each side of 45 mm×46 mm with a view to conductivity measurements using sandpaper of roughness 180. The electrical conductivity measurements were made on the polished sides using a Foerster Sigmatest 2.069 measuring apparatus at 60 KHz.

Table 2 hereinafter shows, for each first test part, the thermal treatment temperature (° C.), the thermal treatment duration, the yield strength at 0.2% Rp0.2 (MPa), the tensile strength (Rm), the elongation at rupture A (%), as well as the electrical conductivity (MS·m$^{-1}$). The tensile properties (yield strength, tensile strength and elongation at rupture) were determined using the first test parts, along the manufacturing direction Z, whereas the electrical properties (thermal conductivity) were determined on the second test parts. In Table 2 hereinafter, the duration of 0 h corresponds to a lack of thermal treatment.

TABLE 2

| Duration (h) | Temperature (° C.) | Rp0.2 (MPa) | Rm (MPa) | A (%) | σ (MS/m) |
|---|---|---|---|---|---|
| 0 | — | 282 | 405 | 4.5 | 24.64 |
| 1 | 400 | 262 | 378 | 7.4 | 24.84 |
| 4 | 400 | 217 | 313 | 11.3 | 26.5 |
| 10 | 400 | 187 | 362 | 14.7 | 27.57 |
| 100 | 400 | 152 | 303 | 22 | 28.93 |
| 104 | 450 | 136 | 272 | 18.6 | 29.82 |
| 14 | 350 | 268 | 228 | 6.2 | 25.51 |
| 56 | 350 | 215 | 199 | 9.9 | 25.61 |

In the absence of thermal treatment, the yield strength Rp0.2 attains 282 MPa, and the elongation at rupture is equal to 4.5%. Applying a thermal treatment makes it possible to lower the yield strength, but it makes it possible to increase the electrical conductivity and the elongation at rupture. It is observed that the elongation at rupture is always greater than 3%. In the absence of thermal treatment, the mechanical properties of the manufactured part are considered to be satisfactory. When it is sought to favor a compromise between the mechanical properties and the thermal or electrical conduction properties, it is preferable to apply a thermal treatment, and for example:
- from 200° C. to less than 400° C., the duration being from 0.1 h to 20 h;
- from 400° C. to 500° C., the duration being from 0.1 h to 5 h;

When a thermal treatment is applied with a view to enhancing the thermal or electrical conduction properties, it is preferable for its temperature to be less than 500° C. or preferably less than 450° C., and for example from 100° C. to 450° C. It can in particular consist of an aging or an annealing. Its duration can exceed 10 hours, or even 100 hours.

FIG. 2 illustrates the tensile properties (Y-axis, representing the yield strength Rp0.2) as a function of the thermal conductivity properties (X-axis, representing the thermal conductivity). It is recalled that the thermal conduction properties are assumed to be representative of the electrical conduction properties. In FIG. 2, the percentages indicate the elongation at rupture. The term "No THT" means no thermal treatment.

Such a binary alloy has a relatively low liquidus temperature (of the order of 660° C.), which alloys a good capability to be atomized using standard industrial atomizers for aluminum alloys. The liquidus was determined using the powder.

The relative density of the samples is greater than 99%, which conveys a porosity<1% measured by image analysis on a polished sample section.

According to an embodiment, the process can include a hot isostatic compression (HIC). The HIC treatment can particularly make it possible to enhance the elongation properties and the fatigue properties. The hot isostatic compression can be carried out before, after or instead of the thermal treatment. Advantageously, the hot isostatic compression is carried out at a temperature of 250° C. to 500° C. and preferably of 300° C. to 450° C., at a pressure of 500 to 3000 bar and for a duration of 0.5 to 50 hours.

The potential thermal treatment and/or the hot isostatic compression makes it possible in particular to increase the electrical or thermal conductivity of the product obtained.

According to a further embodiment, adapted to structural hardening alloys, a solution heat treatment followed by a quenching and an aging of the part formed and/or a hot isostatic compression can be carried out. The hot isostatic compression can in this case advantageously replace the solution heat treatment.

However, the process according to the invention is advantageous, as it needs preferably no solution heat treatment followed by quenching. The solution heat treatment can have a harmful effect on the mechanical strength in certain cases by contributing to growth of dispersoids or fine intermetallic phases.

According to an embodiment, the method according to the present invention further optionally includes a machining treatment, and/or a chemical, electrochemical or mechanical surface treatment, and/or a tribofinishing. These treatments can be carried out particularly to reduce the roughness and/or enhance the corrosion resistance and/or enhance the resistance to fatigue crack initiation.

Optionally, it is possible to carry out a mechanical deformation of the part, for example after additive manufacturing and/or before the thermal treatment.

Though described in relation to an SLM type additive manufacturing method, the process can be applied to other WAAM type additive manufacturing methods, mentioned in relation to the prior art. FIG. 3 represents such an alternative. An energy source 31, in this case a torch, forms an electric arc 32. In this device, the torch 31 is held by a welding robot 33. The part 20 to be manufactured is disposed on a support 10. In this example, the part manufactured is a wall extending along a transverse axis Z perpendicularly to a plane XY defined by the support 10. Under the effect of the electric arc 12, a filler wire 35 becomes molten to form a weld bead. The welding robot is controlled by a digital model M. It is moved so as to form different layers $20_1 \ldots 20_n$, stacked on one another, forming the wall 20, each layer corresponding to a weld bead. Each layer $20_1 \ldots 20_n$ extends in the plane XY, according to a pattern defined by the digital model M.

The diameter of the filler wire is preferably less than 3 mm. It can be from 0.5 mm to 3 mm and is preferably from 0.5 mm to 2 mm, or from 1 mm to 2 mm. It is for example 1.2 mm. Further processes can also be envisaged, for example, and non-restrictively:
- Selective Laser Sintering or SLS;
- Direct Metal Laser Sintering or DMLS;
- Selective Heat Sintering or SHS;
- Electron Beam Melting or EBM;
- Laser Melting Deposition;
- Direct Energy Deposition or DED;
- Direct Metal Deposition or DMD;
- Direct Laser Deposition or DLD;
- Laser Deposition Technology;
- Laser Engineering Net Shaping;
- Laser Cladding Technology;
- Laser Freeform Manufacturing Technology or LFMT;
- Laser Metal Deposition or LMD;
- Cold Spray Consolidation or CSC;
- Additive Friction Stir or AFS;
- Field Assisted Sintering Technology, FAST or spark plasma sintering; or
- Inertia Rotary Friction Welding or IRFW.

The invention claimed is:

1. A process for manufacturing a part including a formation of successive metal layers, which are superimposed on each other, each layer being formed by depositing a filler metal, the filler metal being subjected to a supply of energy so as to become molten and to constitute, upon solidifying, said layer, the process being wherein the filler metal is an aluminum alloy consisting of the following alloy elements (% by weight);
   Fe: 2% to 8%, and optionally 2% to 6%, optionally 3 to 5%;
   optionally Zr: 0.5% to 2.5%, or 0.5 to 2%, or 0.7 to 1.5%, or <0.5%, or <0.2%, or <0.05%;
   optionally Si: <1%, or <0.5% or <0.2%, or <0.05%;
   optionally Cu: ≤0.5%, or <0.2%, or <0.05%;
   optionally Mg: ≤0.2%, optionally ≤0.1% optionally <0.05%;
   optionally other alloy elements<0.1% individual and in total<0.5%, wherein the other alloy elements are selected from the group consisting of: V, Ti, Mo, W, Nb, Ta, Sc, Zn, Hf, Nd, Co, La, Ag, Li, Yb, Er, Sn, In, Sb, Sr, Ba, Bi, Ca, P, B and mischmetal;
   impurities: <0.05%, or <0.01% individually, and in total<0.15%;
   remainder aluminum.

2. The process according to claim 1, wherein mass fraction of each other alloy element is less than 300 ppm, or less than 200 ppm, or less than 100 ppm.

3. The process according to claim 1, wherein:
   Fe: 2% to 8%;
   Zr: 0.5% to 2.5%;
   Si: <0.5%.

4. The process according to claim 1, wherein:
   Fe: 2% to 8%;
   Zr: <0.5%;
   Si: <0.5%.

5. The process according to claim 1, including, following formation of the layers, an application of a thermal treatment.

6. The process according to claim 5, wherein the thermal treatment is an aging or an annealing, performed at a temperature optionally from 200° C. to 500° C.

7. The process according to claim 5, wherein the thermal treatment is performed:
   at a temperature from 200° C. to less than 400° C., optionally from 320 to 380° C., in which case the duration of the thermal treatment is from 0.1 h to 20 h;
   or at a temperature from 400° C. to 500° C., in which case the duration of the thermal treatment is from 0.1 h to 5 h.

8. The process according to claim 5, including no quenching following formation of the layers or the thermal treatment.

9. The process according to claim 1, wherein the filler metal takes the form of a powder, the exposure of which to a light beam or charged particles results in a localized melting followed by a solidification, so as to form a solid layer.

10. The process according to claim 1, wherein the filler metal is obtained from a filler wire, the exposure of which to a heat source results in a localized melting followed by a solidification, so as to form a solid layer.

11. The process according to claim 1, wherein the aluminum alloy comprises less than 500 ppm, optionally less than 300 ppm, optionally less than 200 ppm, optionally less than 100 ppm, or optionally no V, Ti, Mo.

12. The process according to claim 1, wherein Si: <0.5% or Si<0.2% or Si<0.05%.

13. The process according to claim 1, wherein Fe: >3% and ≤8%.

14. The process according to claim 9, wherein the powder is such that at least 80% of the particles making up the powder have a mean size of: 5 μm to 100 μm, optionally from 5 to 25 μm, optionally from 20 to 60 μm.

15. The process according to claim 10, wherein the diameter of the filler wire is from 0.5 mm to 3 mm, optionally from 0.5 mm to 2 mm, optionally from 1 mm to 2 mm.

* * * * *